United States Patent [19]
Chenel

[11] 3,876,489
[45] Apr. 8, 1975

[54] MANUFACTURE OF MULTI-PANE WINDOWS

[75] Inventor: Pierre Chenel, Enghien, France

[73] Assignee: Saint-Gobain Industries, Neuilly-sur-Seine, France

[22] Filed: Dec. 19, 1973

[21] Appl. No.: 425,965

[30] Foreign Application Priority Data
Dec. 21, 1972 France .......................... 72.45706

[52] U.S. Cl. ............... 156/566; 118/324; 156/578; 156/107; 156/109; 214/1 S; 214/1 Q
[51] Int. Cl............................ C03c 27/00; B25j 3/00
[58] Field of Search .......... 156/107, 356, 357, 563, 156/6, 578, 500, 109; 214/1 S, 1 Q; 118/322, 324

[56] References Cited
UNITED STATES PATENTS

| | | | |
|---|---|---|---|
| 3,097,061 | 7/1963 | Woelk.................. | 156/109 |
| 3,391,805 | 7/1968 | Baden.................. | 156/109 |
| 3,531,346 | 9/1970 | Jameson............... | 156/107 |
| 3,733,237 | 5/1973 | Wolff................... | 156/107 |
| 3,822,172 | 7/1974 | Rullier................. | 156/109 |

FOREIGN PATENTS OR APPLICATIONS
635,416   1/1962   Canada....................... 156/109

*Primary Examiner*—Douglas J. Drummond
*Attorney, Agent, or Firm*—Pennie & Edmonds

[57] ABSTRACT

Apparatus for making two-pane thermal windows with the panes thereof separated by plastic filaments around the edge withdraws alternate glass sheets from a conveyor line, carries them at their four edges successively past an extruding station where a plastic filament is laid down on one face thereof, combines the sheets having a plastic filament thereon with the remaining sheets, and extrudes a further filament and applies a protective tape to the periphery of the assembly. Apparatus for the manufacture of three-pane windows applies a plastic filament to two out of three sheets from the conveyor line and includes an additional assembly station at which a third sheet bearing a plastic filament is combined with two sheets already combined together.

11 Claims, 16 Drawing Figures

MANUFACTURE OF MULTI-PANE WINDOWS

The present invention pertains to apparatus for the automatic manufacture of thermal windows comprising two or more air-spaced sheets of glass separated by plastic filaments or "beads" around the periphery thereof.

In such windows the plastic beading performs a double function. On the one hand, it effects a seal, desirably airtight, of the air trapped between adjacent sheets of glass and on the other hand it holds the sheets of glass at a suitable spacing from each other.

For this beading function two plastic filaments are preferably employed. The first, on the inside, i.e., toward the space trapped between adjacent sheets of glass, performs the hermetic sealing function above-described. It may for example be made of polyisobutylene and includes desiccating agents. The second, outer filament provides mechanical protection and sustains the glass sheets in correct relative position. It may be made for example of a silicone type elastomer or of a polysulfide.

The first plastic filament, disposed toward the inside of the space between sheets, may itself be made of two plastic filaments in contact with each other delivered from the same extrusion head, one containing the desiccating agent and the other not.

In one presently preferred embodiment, apparatus according to the invention comprises a combination of:

a. two means to support and transport flat sheets of glass in parallel flows, one serving for application of the spacing filament or filaments to its sheets at an extrusion station and the other serving for assembly together of pairs of sheets including one from each stream;

b. upstream of the extrusion station, a transverse transport mechanism connecting the two transport means of paragraph a;

c. downstream of the extrusion station, a turn-over device adapted to grasp at its lower face a sheet of glass which has passed the extrusion station and to deliver it, after turning it over, onto the assembly transport means of paragraph a;

d. a further transport means which may extend parallel to the assembly transport means, downstream of the latter and connected thereto by a second turn-over device which grasps the assembled pairs of glass sheets and positions them vertically on the further transport means; and e. control means to position and actuate the transport and glass handling devices.

For the manufacture of windows including three glass panes, the apparatus includes in addition a second transverse transport mechanism disposed between the extruding station and the further, vertical transport means, and a third turn-over device connecting the second transverse transport mechanism to the vertical transport means.

BRIEF DESCRIPTION OF THE DRAWINGS

The invention will now be further described in terms of a number of presently preferred embodiments and with reference to the accompanying drawings wherein:

In FIG. 1 there has been shown fragmentarily an insulating window comprising two sheets 1 and 2 of glass separated by a peripheral plastic filament 4, of polyisobutylene for example. The filament 4 may in certain embodiments be obtained by simultaneous extrusion of two filaments, one containing a desiccating agent and the other not. Between the filament 4 and the edges of the glass sheets 1 and 2 there is injected toward the close of the fabrication operation a filament 5 of a silicone elastomer which supports the sheets in correct relative position. Finally an adhesive strip 6 is wrapped aroundd the edge of the combined window so as to protect against mechanical damage to the glass and to the outer filament side.

For the manufacture of two-pane windows one of the glass sheets is provided by extrusion with a peripheral plastic filament 4, of polyisobutylene for example. The two sheets 1 and 2 are thus combined to obtain a double window which will then be finished by provision of the outer plastic filament 5, for example of silicone rubber, and by addition of the protective strip. These last two operations may be performed simultaneously.

Figure 3:
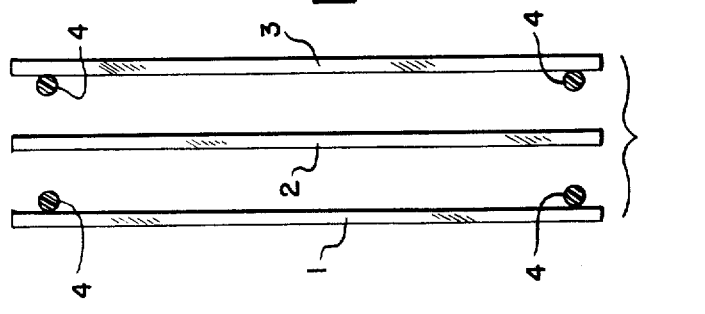
FIG. 3 is a diagrammatic view of the three panes of the window of FIG. 2 with the hermetic sealing filaments applied to the two outer panes, prior to assembly of the three panes together.

The invention comprehends windows including two, three, and more than three glass panes. FIG. 2 is a view similar to that of FIG. 1 but showing a three-pane window. In FIG. 3 there is schematically shown a section of the sheets of a triple window on the outside sheets of which the plastic filament 4 has been deposited for subsequent assembly of the sheets together. In the apparatus hereinafter described for the manufacture of three-pane windows the outer sheets 1 and 3 are initially and separately provided by extrusion each with a peripheral plastic filament 4, of polyisobutylene for example, whereas the intermediate sheet 2 has no plastic filaments thereon. The apparatus makes it possible first to combine the sheets 1 and 2, pressing them together and thereafter to combine with them the third sheet 3 so as to obtain a triple window which will then be finished by provision of the outer plastic filaments 5 of silicone rubber and by addition of the protective strip 6, these last two operations being carried out simultaneously.

The apparatus according to the invention is intended and may be constructed to achieve entirely automatic fabrication of double or triple windows of the type hereinabove described.

There will first be described an embodiment of the apparatus of the invention for the manufacture of two-sheet windows.

In the apparatus hereinafter described, two types of carriers or conveyors are employed for transport of sheets of glass in a substantially horizontal position. The first comprises endless parallel belts which pass over pulleys. The other comprises sets of wheels or rollers on parallel axes. The belt-type carriers are indicated by sets of continuous parallel lines as for example in the belt conveyors 7, 9 and 11 of FIG. 4 whereas the roller-type carriers are indicated by sets of discontinuous lines as for example in the roller conveyors 10 and 28 of FIG. 4. In both cases, the direction of motion of the glass sheets on the carrier is parallel to the length of the lines. Roller conveyors and belt conveyors may be provided in superposition at the same location, with one being arranged to be raised to pick up a sheet of glass from the other and to be lowered to deposit a sheet of glass on the other. When so superposed, the two conveyors can be arranged to carry the glass in parallel directions or in perpendicular directions.

Figure 4:
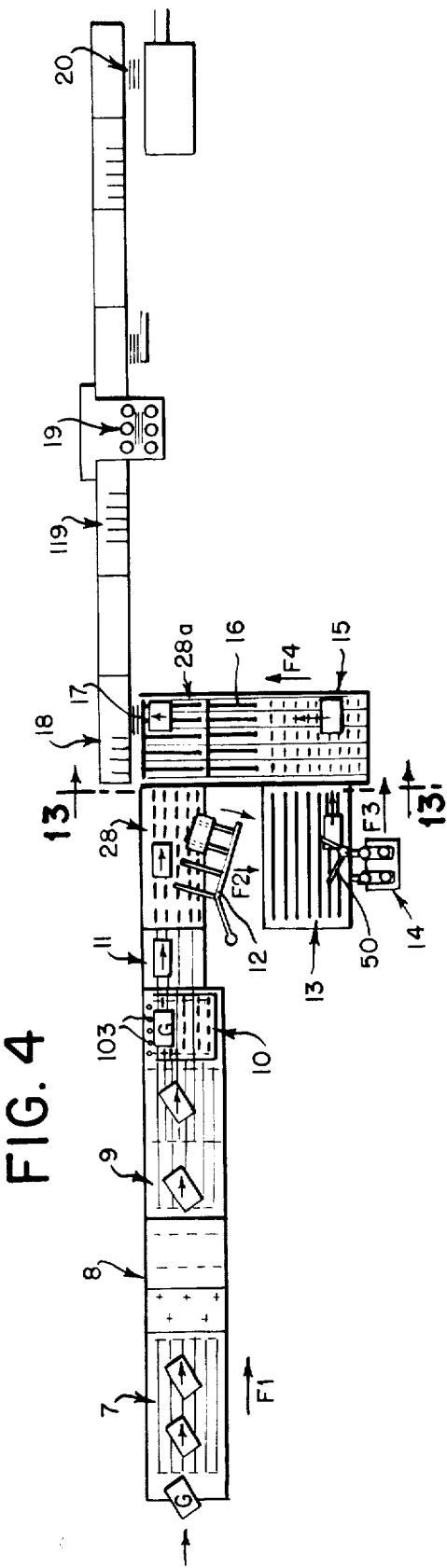
FIG. 4 is a diagrammatic view in plan of one form of apparatus according to the invention as applied to the manufacture of two-pane windows.

In the apparatus shown in plan in FIG. 4, the glass sheets are schematically indicated at rectangles G and they move from left to right in the figure in the direction indicated by the arrow F1.

Beginning at the left, the installation comprises a belt carrier 7 on which the sheets advance one after another. This carrier is followed by a washing machine, diagrammatically indicated at 8, where the sheets are washed, dried and de-ionized to retard adherence of dust particles thereto. From the washing machine 8 the sheets pass onto the belt carrier 9.

Figure 12:
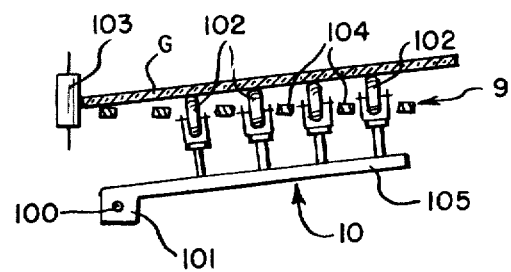
FIG. 12 is a detail sectional view of part of the conveyor 28 of FIG. 4.

Since it is necessary to position the sheets accurately preparatory to performance of the subsequent operations thereon there is provided within the area of belt carrier 9 a tiltable roller table or carrier 10, seen in section in FIG. 12. This table, having a rectangular shape when seen in plan, includes a plurality of parallel rows of rollers 102, the rollers of each row being supported from an arm 105 to pass between adjacent belts 104 (of which the upper run only is shown) of the carrier 9, the arms extending from a common shaft 101 pivoted at 100. Each glass sheet G is lifted from the belts 104 by the table 10 into a slant position from which it rolls forward (in the direction of the arrow F1 in FIG. 4) and also slides laterally under the influence of gravity against a set of stationary positioning rollers 103 pivoted about vertical axes. The table 10 is then again lowered to rest the sheet on the belts of carrier 9.

Figure 7:
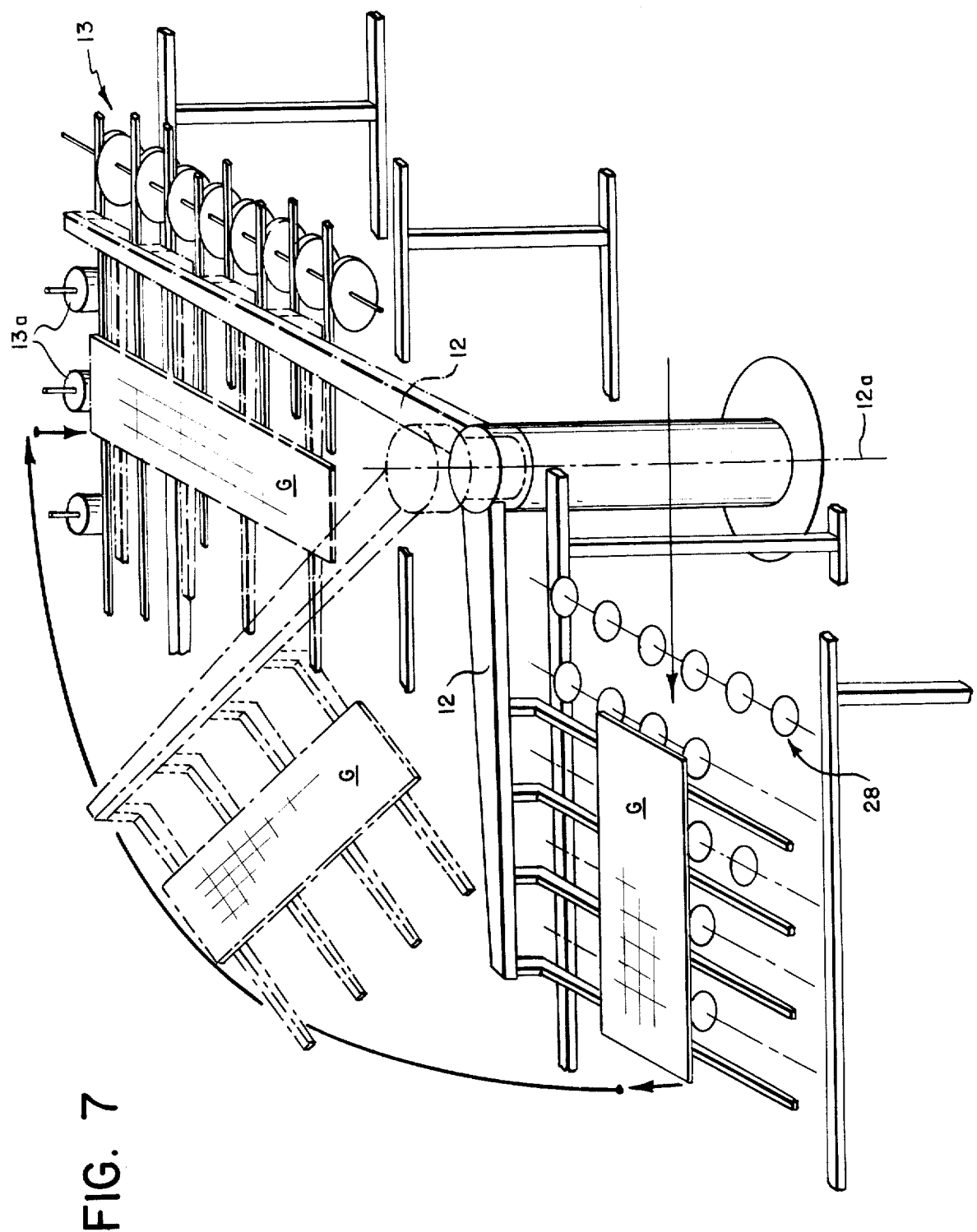
FIG. 7 is a diagrammatic view of the transverse transport mechanism which in the apparatus of FIG. 4 and in that of FIGS. 5 and 6 delivers selected glass sheets from the first transport means to the second for carriage past the extrusion station by that second transport means and by the apparatus of FIG. 10.
Figure 11:
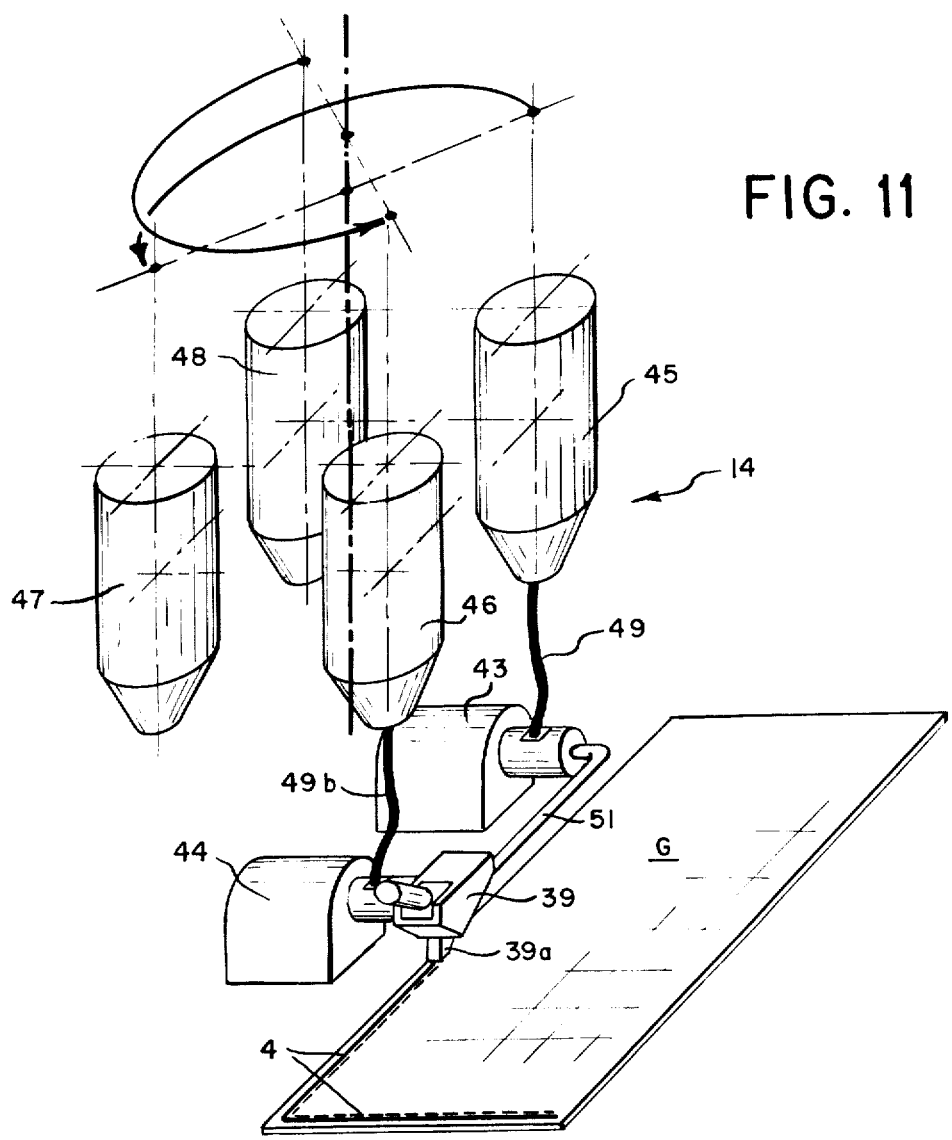
FIG. 11 is a further diagrammatic representation of the extrusion apparatus.
Figure 13:
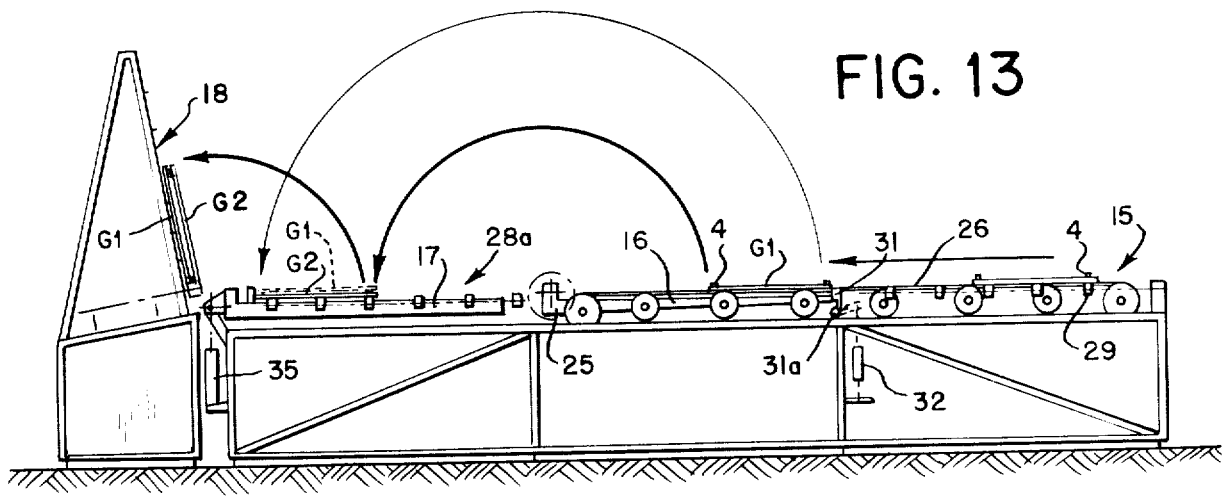
FIG. 13 is a sectional view in elevation, at an enlarged scale, taken on the line 13—13 in FIG. 4.

The glass sheets, thus suitably positioned laterally on the carrier 9, then pass from carrier 9 to a holding belt conveyor 11 whose belts can be stopped. When the position downstream of conveyor 11 is free, i.e., when no glass sheet is resting on roller conveyor 28, the sheet on carrier 11 passes to the roller conveyor or table 28, whose rollers can be driven. In the manufacture of two-pane windows, illustrated in FIG. 4, one sheet out of every two is permitted to pass from the table 28 to the adjacent roller table 28a, seen also in FIG. 14. The other, alternate sheets are lifted one by one from the table 28 of FIG. 4 by a fork 12, further illustrated in FIG. 7. This fork possesses tines which pass between adjacent rows of rollers in the table 28. It is mounted for rotation about a vertical axis 12a and also for limited up and down motion along that axis. The tines are passed beneath the sheet G resting on the rollers of the table 28. The fork is then lifted, rotated clockwise through some 90°, as seen in FIGS. 4 and 13, and lowered again to deposit the sheet on the belts of conveyor 13 where the sheet is aligned by a set of alignment rollers 13a (FIG. 7) similar to rollers 103 of FIG. 15. The belts of the conveyor 13 then carry the sheet, resting against the rollers 13a, past the extruder generally indicated at 14 in FIG. 4, and further illustrated in FIGS. 8, 9 and 11.

Figure 8:
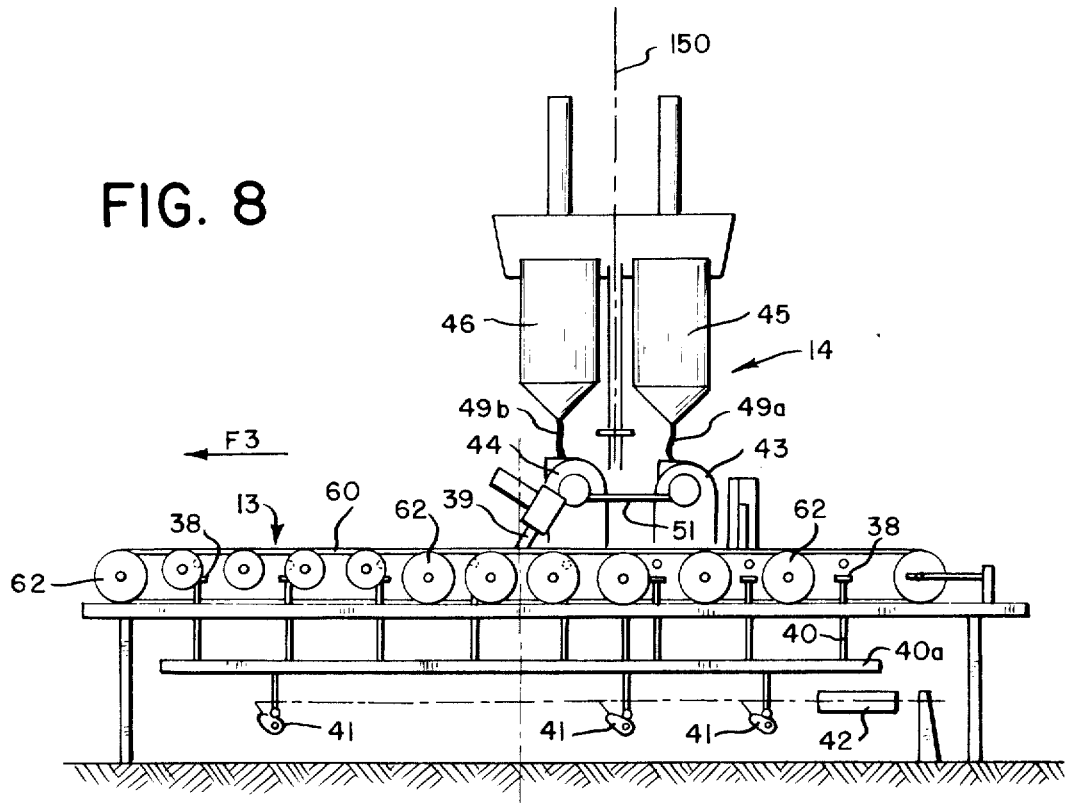
FIG. 8 is a diagrammatic representation in elevation of the extrusion station.
Figure 9:
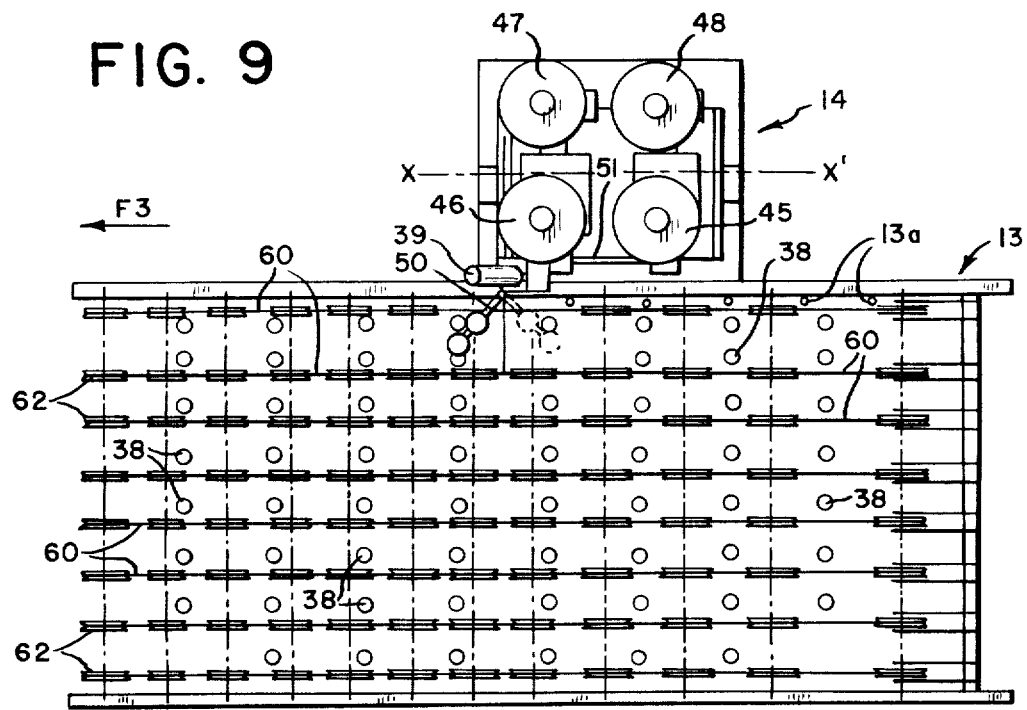
FIG. 9 is a plan view of the extrusion station and of the associated sheet transport means.

In FIGS. 8 and 9 the carrier 13 is seen to include a plurality of parallel belts 60, the direction of motion of whose upper run is indicated by the arrow 3. The direction F3 is parallel to the direction F1, F2 identifying the transverse motion of the sheets on fork 12 from carrier 28 to carrier 13. These belts are supported on pulleys 62. The tines of the pivoted fork 12 of FIG. 7 can pass between adjacent of these belts so as to deposit onto them the sheet of glass to be provided with the plastic filament. For proper positioning of the glass sheet, it bears at one edge against the rollers 13a during the course of its passages in front of the extruder.

The plastic filament deposited is a double one formed by combination, in an extrusion nozzle 39, of a filament 49a (FIG. 8) which contains a desiccating agent and which comes from the reservoir 45, and of a further filament 49b without desiccating agent coming from the reservoir 46. The two filaments pass through extruders 43 and 44 so as to be delivered together under pressure at the common injection nozzle 39.

The plan view of FIG. 9 shows that there are provided four reservoirs or storage containers 45 to 48 for the material of which the plastic filaments are made. The assembly of four containers pivots about a vertical axis 150 (FIG. 8) so that the containers are used in pairs. When the pair 45 and 46 is exhausted or nearly so the container assembly is rotated through 180° to bring the containers 47 and 48 into operative position.

Figure 10:
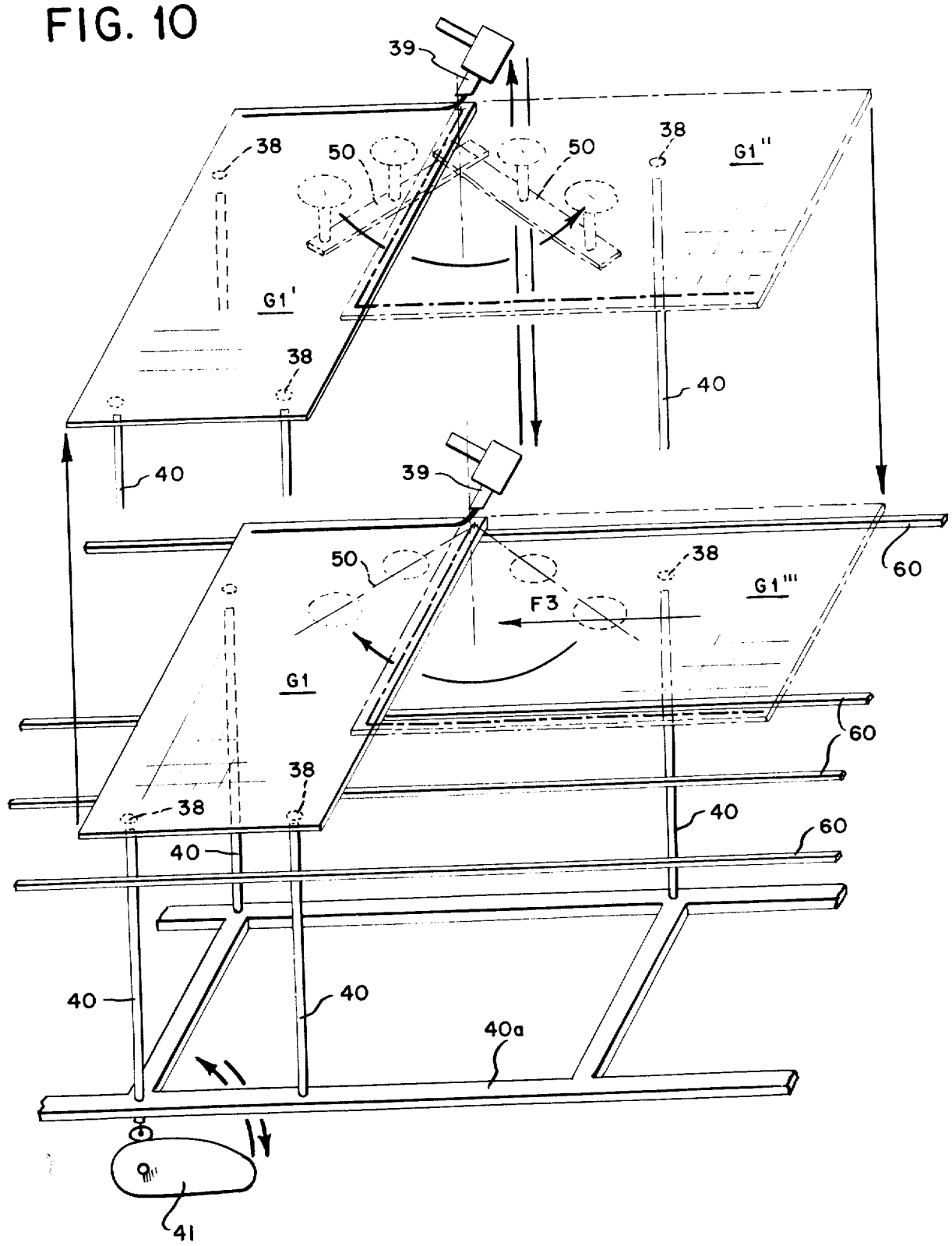
FIG. 10 is a diagrammatic exploded view of the mechanism by which in FIGS. 8 and 9 the plastic filament is applied successively along the four edges of one face of selected glass sheets.

The advance of the sheets of glass past the extrusion station 14, and more particularly past the nozzle 39, is effected by the belts 60 with the aid of the rotator 50 illustrated in FIG. 10. Each time a corner of a glass sheet comes under the nozzle 39, the sheet is grasped by a suction cup device 50 shown in FIG. 10 which lifts the sheet above the belts 60 and rotates it in a horizontal plane through 90°, counterclockwise as seen in FIG. 10. The sheet is then returned to the carrying belts 60 to permit the plastic filament to be laid down along the next edge of the rectangular sheet, in the course of leftward rectilinear translation of the sheet in FIG. 10.

Since the suction device 50 may be small by comparison with the dimensions of the sheet, a supplementary transport device is provided having a set of caster-type rollers 38. These are supported on vertical members 40 affixed to a framework 40a which can be raised and lowered by cams 41 rotated by a means of a hydraulic cylinder 42 (FIG. 8).

When the suction device 50 lifts the glass sheet, the extrusion assembly comprising containers 45 to 48, extruders 43 and 44 and nozzle 39, rotates about a horizontal axis x-x' shown in FIG. 9 so as to raise and retract the nozzle 39 and permit lifting of the glass sheet. In FIG. 10 the vertical motion of the suction device 50 and of the glass carried by it is much exaggerated. In that figure reference character G1 represents a glass sheet on which the filament has been laid down along one of its four sides. At the completion of the filament along the short side there seen under the injection nozzle 39, the sheet is lifted as hereinabove described to the position G1'. It is then rotated through 90°, counterclockwise as seen in FIG. 10 into the positon G1" whereupon, after the sheet has been lowered again to the position G1''', the plastic filament is laid down along the second side of the sheet. It will be recalled that it is only after the sheet has been so lowered that it will be translated past the injection station by motion of the belts 60. The cycle of operation of the apparatus of FIG. 10 is suitably repeated to lay the filament down along the four edges of the sheet. Conveyor 13 with its belt 60 and the rotator 50 thus constitutes second conveyor means to carry a sheet of glass past the filament-forming nozzle to present the edges of that sheet successively to the nozzle.

When the glass sheet on the belt carrier 13 has received a plastic filament along its four edges, on one face thereof, it is translated to the right in FIG. 4 onto a combined belt and roller carrier table generally indicated at 15. This operation is further illustrated in FIG. 14. The carrier 15 includes a plurality of rows of driven rollers 29 mounted on axes perpendicular to the belts 60 of carrier 13, permitting motion of a glass sheet in the direction F3 of FIGS. 4 and 14, i.e., a continuation of the motion imposed by belts 60 of carrier 13. A stop bar 30 limits this motion of the glass sheets.

Figure 14:
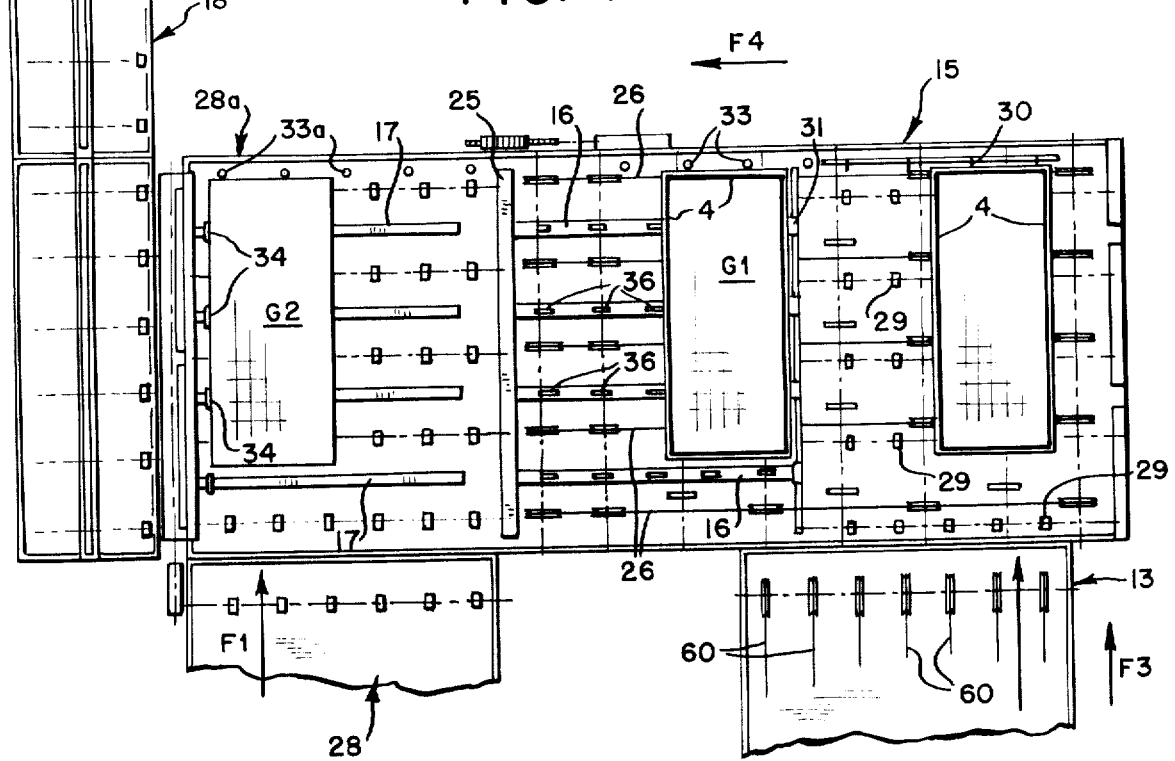
FIG. 14 is a fragmentary plan view at an enlarged scale of the apparatus of FIG. 4.
Figure 16:
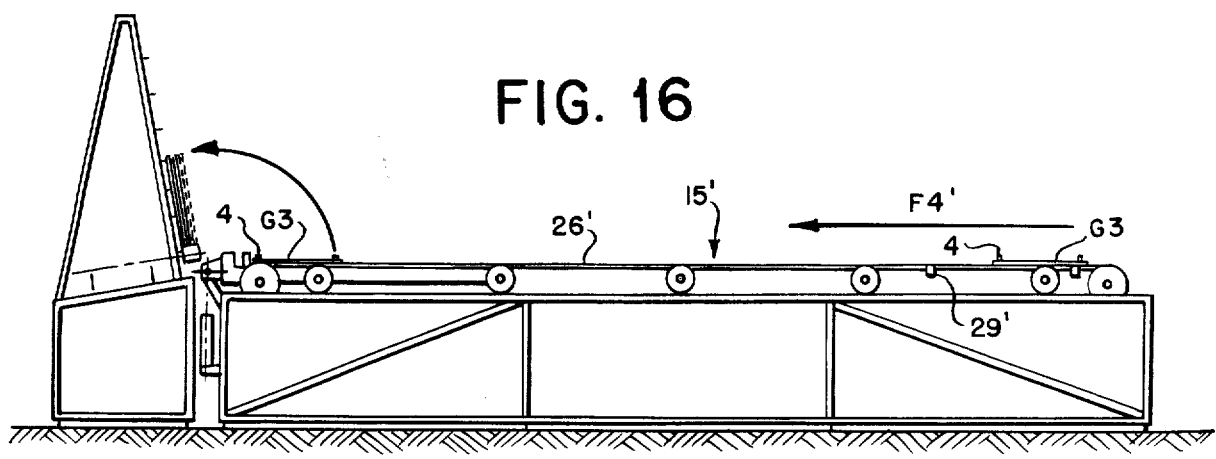
FIG. 16 is a sectional view taken on the line 16—16 of FIG. 15.

Table 15 also includes a belt carrier, whose belts are indicated at 26 in FIG. 14, and the upper runs of which are capable of carrying the glass sheets in the direction F4 of FIG. 14. The belts 26 and their pulleys can be raised and lowered, by mechanism including a hydraulic cylinder not shown. They are lowered to permit carriage of the sheets in the direction F3 of FIG. 14, by operation of rollers 29, and are raised to carry the sheets in the direction F4. In this latter motion, the edge of the sheet which led in the motion in the direction F3, i.e., the edge at the top in FIG. 14 and which constitutes a side edge of the sheet in the motion in the direction F4, is held collinear with the stop bar 30 by a set of rollers 33 similar to the rollers 13a of FIGS. 7 to 9.

Thus when the belts 6 are raised they carry the sheet in the direction F4 and they carry it over the tines of a fork 16, these tines fitting between adjacent of the belts 26. The tines of fork 16 extend from a horizontal shaft 25 about which the fork rotates under influence of a hydraulic cylinder, not shown. The tines are equipped with suction cups 36, connected (like those of the device 50 of FIG. 10) through suitable valving to a source of vacuum. The fork 16 is thus enabled to grasp a sheet, identified at G1 in FIG. 14, at its underside and to rotate it transversely of its own plane through 180°, thereby laying it with the face thereof bearing the filament 4 downward, on top of and in accurate registry with a sheet G2 which has been passed from the carrier 28 to the table 28a, which may thus be regarded as an assembly station for the sheets G1 and G2.

For a correct positioning of the sheet G1 on the fork 16, that sheet comes to a stop, as the fork 16 lifts it from the belts 26, just before the trailing edge of the sheet reaches the position of a set of stops 31 which can be raised and lowered by a cylinder 32 (FIG. 13) and which are lowered at this phase of the operation. The stops 31 pivot about a horizontal axis 31a. The hydraulic cylinder 32 then comes into operation and restores the stops 31 to the position shown for them in FIG. 13. In the process these stops push the sheet G1 a few centimeters farther in the direction F4, into its correct desired position on the fork 16. At this stage the vacuum is applied to the suction cups of the fork 16 to hold the sheet G1 fast thereon.

The sheet G2 is correctly positioned over the tines of a fork 17 (FIG. 14) similar to the fork 16, by operation of additional rollers 33a similar to and collinear with the rollers 33 and by stops 34 forming part of the fork 17 and located near the roots of the tines thereof.

The fork 16 thus lays the sheet G1 on top of the sheet G2 and presses the two together with a light pressure which is however sufficient to cause the two sheets to adhere to each other through the adhesive properties of the filament 4.

The fork 17 is now rotated about a horizontal axis through an angle of the order 95° or 100° by action of the hydraulic cylinder 35 (FIG. 13) so as to deposit the two glass sheets, now united, on the vertical carrier 18 (FIG. 4).

It will be observed that the stops 31, as they engage the sheet G1 on fork 16 and the stops 34 as they engage sheet G2 on fork 17, engage edges of the sheets G1 and G2 which are adjacent to each other in the assembled window. This fact, plus an accurtely collinear relation of the bar 30, rollers 33 and rollers 33a, insures that the two sheets will be assembled together in accurate registry.

The assembly of two glass sheets is conveyed along the conveyor 18, resting on rollers having horizontal axes, to a station 119 where its motion is interrupted to permit it to be heated by a radiant heating panel at that station. From this heating station the assembly is carried to a station 19 where it passes between two sets of rollers, diagrammatically indicated, which press the panes together, squeezing the filament 4 sufficiently to insure a hermetic seal of the two panes.

Figure 1:
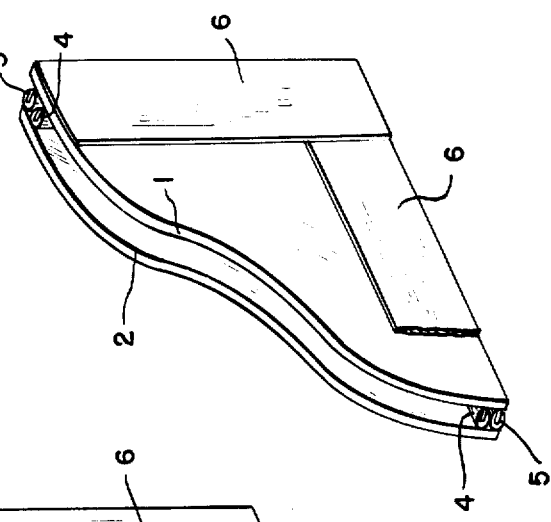
FIG. 1 is a fragmentary perspective view of a two-pane thermal window according to the invention.
Figure 2:
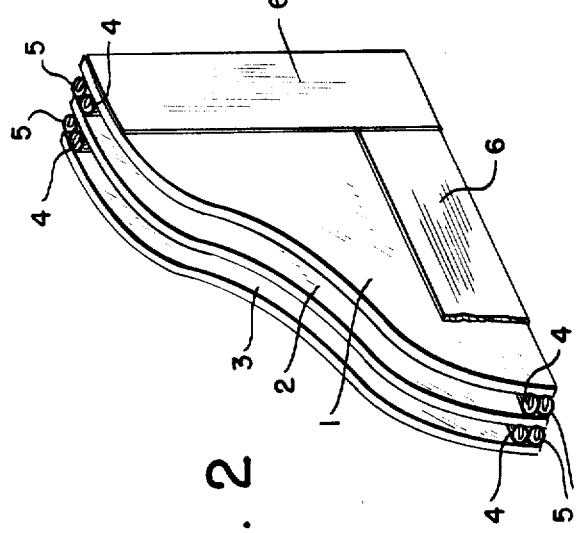
FIG. 2 is a fragmentary perspective view of a three-pane thermal window according to the invention.

The assembly is then carried on to a station 20, including apparatus for automically injecting the outer filament 5 between the edges of the panes 1 and 2 of the assembly and for applying the tape 6, to produce the end product fragmentarily indicated in FIG. 1. Such apparatus is disclosed in U.S. Pat. No. 3,473,988.

Apparatus in accordance with the invention for the manufacture of three-pane windows is illustrated in FIGS. 5, 6, 15 and 16. It includes all of the apparatus which has been described in connection with FIGS. 4 and 7 to 14. It includes in addition the elements of FIG. 15 not common to FIG. 14. These are a roller carrier 70, a combined roller and belt carrier 15', and a fork 17'.

Figure 5:
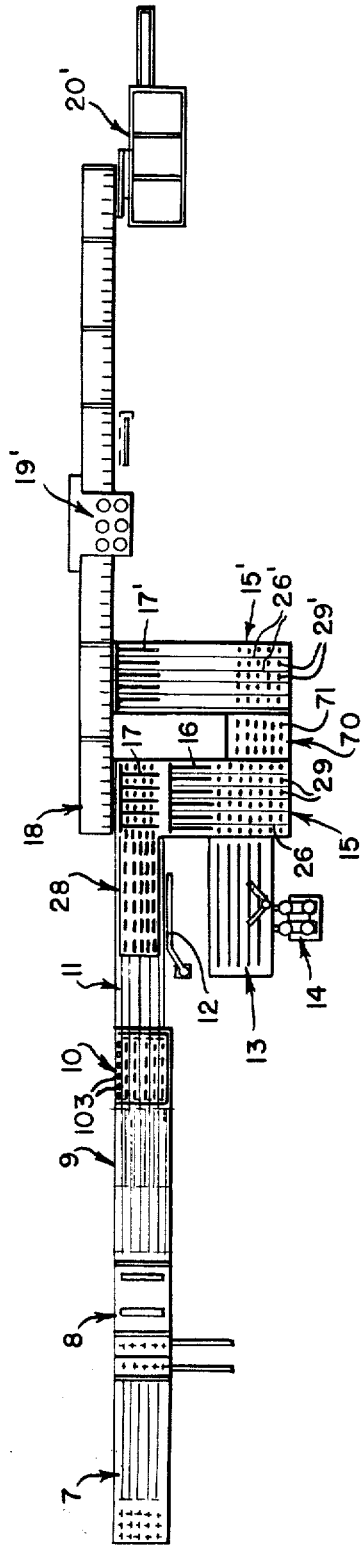
FIGS. 5 and 6 are diagrammatic plan and elevational views of one form of apparatus according to the invention for the production of three-pane windows.
Figure 6:
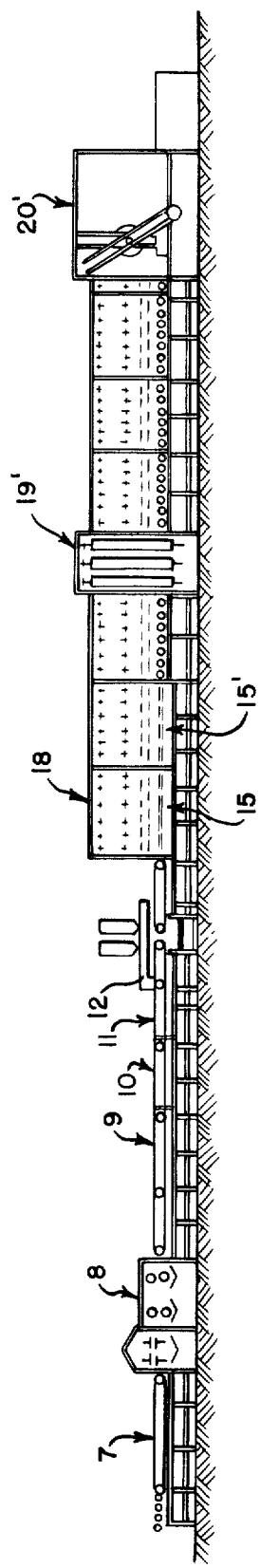

To produce three-pane windows with the apparatus of FIGS. 4, 6, 15 and 16, two out of every three sheets which pass down the line including conveyors 7, 9, 10, 11 and 28 in FIGS. 4 and 5 are diverted from that line by fork 12 and have a filament 4 applied thereto by the extruder 14 and associated elements, in the manner hereinabove described with reference to FIGS. 4 and 7 to 12. Of each two sheets, herein called G1 and G3, thus provided with a filament 4, one, G1, follows the route F4 of FIG. 15 and is combined by fork 17 with another sheet G2 in the way that has been described above for the manufacture of two-pane windows.

In the embodiment of FIGS. 4, 5, 15 and 16 moreover, the stop bar 30 of conveyor 15 is provided with mechanism whereby it may be raised or lowered at will out of the way of a sheet of glass advancing on the rollers 26 of carrier 15 in the direction F3.

Figure 15:
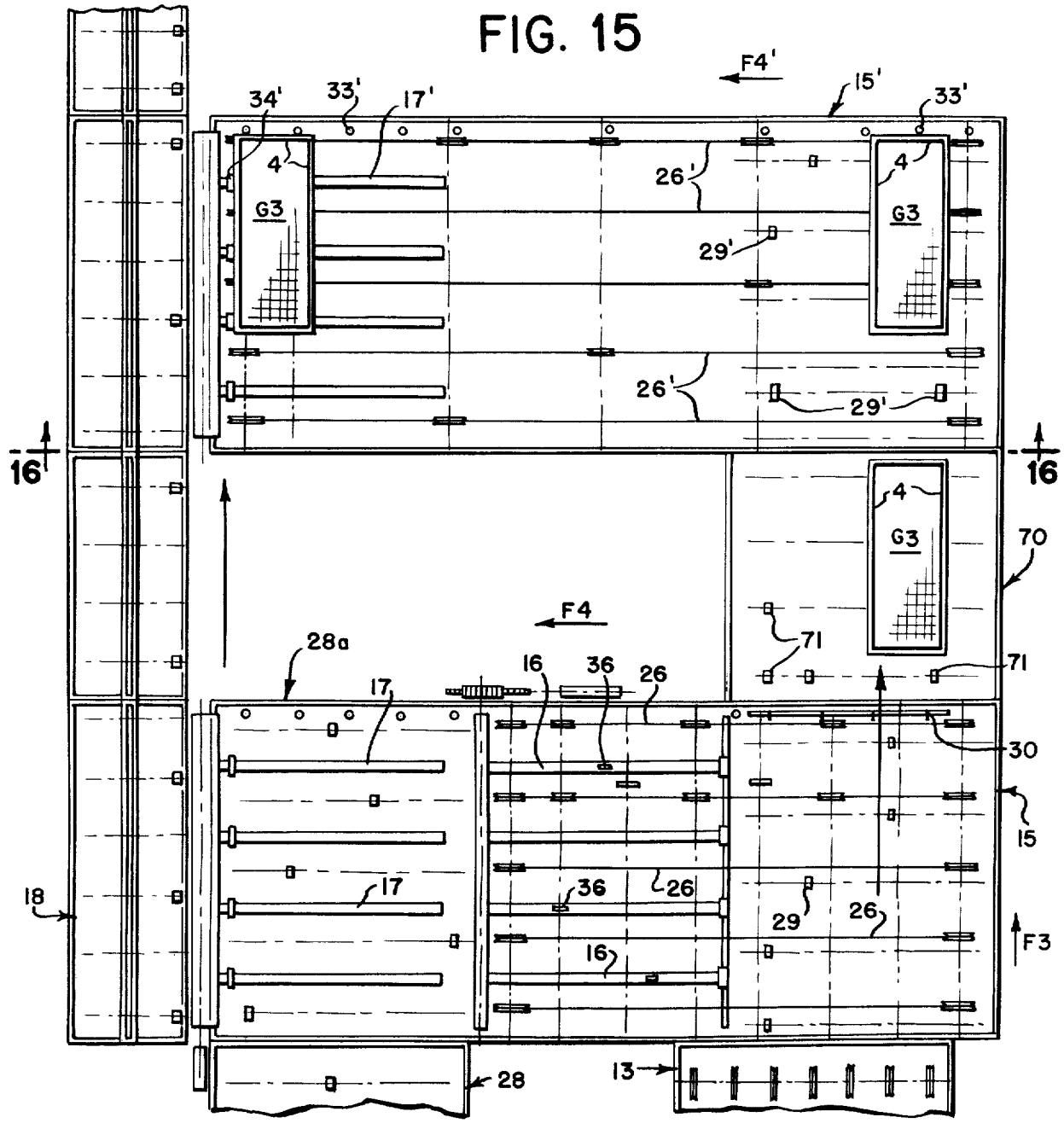
FIG. 15 is a fragmentary plan view at an enlarged scale of the apparatus of FIGS. 5 and 6.

In FIG. 15 the sheet G3 is carried over the lowered stop bar 30 by the rollers 29 and onto the driven rollers 71 of carrier 70, which deliver it onto the driven rollers 29' of the carrier 15'. At this phase of the operation, the belts 26' of the carrier 15' are in their lowered, ineffective position. The sheet G3 continues until it brings up against aligning rollers 33'. The belts 26' of the carrier 15' are then raised. They transport the sheet G3 to the left in FIG. 15, in the direction F4' over the tines of the fork 17' where that sheet is accurately positioned by the leftmost of the aligning rollers 33' and by the positioning stops 34' on the fork 17'. It will be noted that the sheet G3 lies on the fork 17' with that face up which bears the quadrilateral filament 4. A rotation of the fork 17', suitably phased with the motion down the carrier 18 of the two-pane subassembly formed on fork 17, combines the sheet G3 with the sheets G1 and G2 so that the three panes adhere together by adhesive action of the filaments 4. The remaining steps in the manufacture of the three-pane window are the same as those which have been described for the two-pane window. The rollers 19' of FIGS. 5 and 6 must of course be dimensioned in their spacing to handle a three-pane window, and the apparatus of the station 20' must be equipped with the elements necessary simultaneously to insert the two filaments 5, one between panes 1 and 2 and the other between the panes 2 and 3 (FIGS. 2 and 3), and to apply a sealing tape 6 wide enough to seal the triple-pane window.

The invention thus provides apparatus for the manufacture of multiple-pane windows comprising first conveyor means such as conveyors 9, 10, 11, 28 and 28a to deliver sheets of glass to an assembly station, means such as extruder 14 to form a plastic filament, second conveyor means such as conveyor 13 and the device 50 to carry sheets of glass past those forming means, and first transfer means such as fork 12 to transfer sheets of glass from the first conveyor means to those second conveyor means. That apparatus further includes second transfer means such as the roller and belt conveyors 29 and 26 of conveyor 15 and the fork 16 to transfer sheets of glass from those second conveyor means to the assembly station, and means such as the fork 16 at the assembly station to press together a sheet of glass such as the sheet G2 delivered to the assembly station by the first conveyor means and a plastic filament on a sheet of glass such as the sheet G1 delivered by the second transfer means to the assembly station.

The apparatus of the invention may further comprise third means, for example those at station 20, to deposit a further plastic filament 5 between the edges of two spaced sheets of glass, and it may include means such as conveyor 18 to deliver to those depositing means pairs of sheets of glass pressed by the pressing means of fork 16. The apparatus may further comprise, desirably as part of the first conveyor means, means such as the tilting conveyor 10 to dispose sheets of glass with an edge along a predetermined line, e.g., that of the rollers 103 of FIG. 12. The first transfer means may advantageously comprise a fork such as the fork 12, rotatable about and translatable along an axis such as the axis 12a. The pressing means of the apparatus may comprise suction cups like the cups 36 on fork 16, disposed to engage one face of a sheet of glass bearing on its opposite face a plastic filament 4.

The second transfer means may include movable positioning stops such as the stops 31, to locate a sheet of glass in predetermined position with respect to the pressing means. The apparatus according to the invention may further include at the assembly station means such as the stops 33a and 34 to locate in two mutually perpendicular directions sheets of glass such as the sheet G2 of FIG. 14 delivered to that station by the first conveyor means. The apparatus may comprise a third conveyor means such as the conveyor 18 to carry on edge pairs of glass sheets pressed together by the pressing means.

The apparatus may further comprise radiant heating means such as the heater 119 and roller pressing means such as the device 19, disposed adjacent the third conveyor means 18 at spaced locations therealong. It may further comprise means such as the machine 20, disposed adjacent the third conveyor means 18 to inject a plastic filament 5 between the edges of pairs of glass sheets and thereafter to apply an adhesive tape over such edges.

It may further comprise a third transfer means such as the conveyor 15' of FIG. 15 and, adjacent the third conveyor means 18 at a point between the two-pane assembly station and the roller pressing means 19, a second pressing means such as fork 17' to press together two adhered sheets of glass on the third conveyor means 18 and a plastic filament on a sheet of glass, such as G3, delivered by those third transfer means.

While the invention has hereinabove set forth in terms of a number of presently preferred exemplary embodiments, the invention is not limited thereto, but rather comprehends all modifications on and departures from those embodiments properly falling within the scope of the appended claims.

I claim:

1. Apparatus for the manufacture of multiple-pane windows comprising:
   a. first conveyor means to deliver sheets of glass to an assembly station,
   b. means to form a plastic filament,
   c. second conveyor means to carry a sheet of glass past said forming means to present the edges thereof successively to said forming means,
   d. first transfer means to transfer sheets of glass from said first conveyor means to said second conveyor means,
   e. second transfer means to transfer sheets of glass from said second conveyor means to said assembly station, and
   f. means at said assembly station to press together a sheet of glass delivered by said first conveyor means to said assembly station and a plastic filament on a sheet of glass delivered by said second transfer means to said assembly station.

2. Apparatus according to claim 1 further comprising means to deposit a further plastic filament between the edges of two spaced sheets of glass, and means to deliver to said depositing means pairs of sheets of glass pressed by said pressing means.

3. Apparatus according to claim 1 further comprising, as part of said first conveyor means, to dispose sheets of glass with an edge along a predetermined line.

4. Apparatus according to claim 1 wherein said first transfer means comprising a fork rotatable about and translatable along an axis.

5. Apparatus according to claim 1 wherein said pressing means comprise suction cups disposed to engage one face of a sheet of glass bearing on its opposite face a plastic filament.

6. Apparatus according to claim 1 wherein said second transfer means include movable positioning stops to locate a sheet of glass in predetermined position with respect to said pressing means.

7. Apparatus according to claim 6 further including at said assembly station means to locate in two mutually perpendicular directions sheets of glass delivered to that station by said first conveyor means.

8. Apparatus according to claim 1 comprising a third conveyor means to carry on edge pairs of glass sheets pressed together by said pressing means.

9. Apparatus according to claim 8 further comprising radiant heating means and roller pressing means disposed adjacent said third conveyor means at spaced locations therealong.

10. Apparatus according to claim 9 further comprising means disposed adjacent said third conveyor means to inject a plastic filament between the edge of pairs of glass sheets and thereafter to apply an adhesive tape over such edges.

11. Apparatus according to claim 9 further comprising a third transfer means and, adjacent said third conveyor means at a point between said assembly station and roller pressing means, a second pressing means to press together two adhered sheets of glass on said third conveyor means and a plastic filament on a sheet of glass delivered by said third transfer means.

* * * * *